US007006531B2

United States Patent
(12) United States Patent
Samrao

(10) Patent No.: US 7,006,531 B2
(45) Date of Patent: Feb. 28, 2006

(54) METHOD AND APPARATUS FOR TRANSMITTING STREAMED INGRESSING DATA THROUGH A SWITCH FABRIC THAT PROVIDES READ REQUESTS AT AN INGRESS INDEPENDENT REQUEST RATE

(75) Inventor: Gurmohan Singh Samrao, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 723 days.

(21) Appl. No.: 09/790,302

(22) Filed: Feb. 21, 2001

(65) Prior Publication Data

US 2006/0002411 A1 Jan. 5, 2006

(51) Int. Cl.
*H04J 3/16* (2006.01)

(52) U.S. Cl. .................................. 370/470; 370/395.51

(58) Field of Classification Search ................ 370/465, 370/466, 467, 469, 470, 471, 472, 473, 474, 370/401, 468

See application file for complete search history.

(56) References Cited

U.S. PATENT DOCUMENTS

| | | | | |
|---|---|---|---|---|
| 5,315,594 | A * | 5/1994 | Noser | 370/353 |
| 6,122,281 | A * | 9/2000 | Donovan et al. | 370/401 |
| 6,400,730 | B1 * | 6/2002 | Latif et al. | 370/466 |
| 6,636,529 | B1 * | 10/2003 | Goodman et al. | 370/469 |
| 6,658,021 | B1 * | 12/2003 | Bromley et al. | 370/466 |

* cited by examiner

*Primary Examiner*—Duc Ho
*Assistant Examiner*—Thien D Tran
(74) *Attorney, Agent, or Firm*—MacPherson Kwok Chen & Heid

(57) ABSTRACT

An apparatus and method reduce jitter in SPE data transmitted to a switch fabric. A processor receives STS channel requests from the switch fabric, and retrieves SPE data in buffers assigned to the requested STS channels. The processor loads the SPE data in the PDU of a TDM cell, the TDM cell in the PDU of a PIC, and a length of the SPE data in the header of the PIC. The PIC is then embedded in a CSIX frame that is transmitted to the switch fabric through a CSIX interface. The length of the SPE data in the PIC PDU is variable since the processor retrieves SPE data upon demand from the switch fabric. Thus, even if enough data to fill an entire PDU is not in a channel buffer at the time of a channel request, the available data is transmitted so that the opportunity to transmit available SPE data is not lost.

34 Claims, 3 Drawing Sheets

METHOD AND APPARATUS FOR TRANSMITTING STREAMED INGRESSING DATA THROUGH A SWITCH FABRIC THAT PROVIDES READ REQUESTS AT AN INGRESS INDEPENDENT REQUEST RATE

FIELD OF THE INVENTION

The present invention generally relates to SONET/SDH network elements and in particular, to an apparatus and method for reducing jitter in SPE data transmitted to a switch fabric.

BACKGROUND OF THE INVENTION

In a synchronous optical network (SONET) network element (NE), incoming synchronous payload envelope (SPE) data are loaded into buffers upon arrival. When a switch fabric requests SPE data for a channel, the SPE data is retrieved from the channel's buffer, and loaded into a cell payload data unit (PDU) for transmission to and across the switch fabric. If there is insufficient SPE data in the buffer to fill the cell PDU, then nothing is sent to the switch fabric at that time. Since the stream of incoming SPE data arrives asynchronous with the switch fabric operation, such a retrieval and cell loading mechanism may cause undesirable jitter in the SPE data stream received on the outgoing side of the switch fabric.

OBJECTS AND SUMMARY OF THE INVENTION

Accordingly, one object of the present invention is an apparatus for reducing jitter in SPE data transmitted to a switch fabric.

Another object is a method for reducing jitter in SPE data transmitted to a switch fabric.

These and additional objects are accomplished by the various aspects of the present invention, wherein briefly stated, one aspect of the invention is an apparatus for reducing jitter in SPE data transmitted to a switch fabric, comprising: a buffer for receiving SPE data, and means for receiving a request from a switch fabric to transmit contents of the buffer in a payload data unit regardless of whether there is any or the amount of SPE data in the buffer at the time of the request, segmenting SPE data from the buffer into the payload data unit, and transmitting the payload data unit alone with a length of the segment of SPE data in the payload data unit back to the switch fabric.

Another aspect is an apparatus for reducing jitter in SPE data transmitted to a switch fabric, comprising: buffers allocated to channel numbers, and means for receiving read requests and channel numbers from a switch fabric, segmenting SPE data from buffers allocated to the channel numbers, determining lengths of the segmented SPE data, and transmitting the payload data units along with their corresponding lengths back to the switch fabric regardless of whether the payload data units are full or not.

Yet another aspect is a method for reducing jitter in SPE data transmitted to a switch fabric, comprising: receiving a read request from a switch fabric to transmit contents of a buffer corresponding to the read request in a payload data unit regardless of whether there is or the amount of SPE data in the buffer at the time of receiving the read request, segmenting SPE data from the buffer into the payload data unit, determining a length of the segmented SPE data, and transmitting the payload data unit along with the length to the switch fabric at a transmission rate.

Still another aspect is an apparatus for reducing jitter in SPE data transmitted to a switch fabric, comprising: a buffer for receiving SPE data; and logic configured to receive a request from a switch fabric to transmit contents of the buffer regardless of whether there is any or the amount of SPE data in the buffer at the time of the request, segment SPE data from the buffer into a payload data unit of a first cell, determine a length of the segment of SPE data in the payload data unit of the first cell and transmit the first cell in a payload data unit of a second cell and the length of the segment of SPE data in a header of the second cell.

Additional objects, features and advantages of the various aspects of the present invention will become apparent from the following description of its preferred embodiment, which description should be taken in conjunction with the accompanying drawing.

DETAILED DESCRIPTION OF THE PREFERRED EMBODIMENT

The following description and claimed invention are applicable to both synchronous optical network (SONET) and synchronous digital hierarchy (SDH) network elements and components. Accordingly, to simplify the following description and claims, it is to be understood that the term SONET, as used herein, shall be interpreted as including both SONET and SDH.

Figure 1:
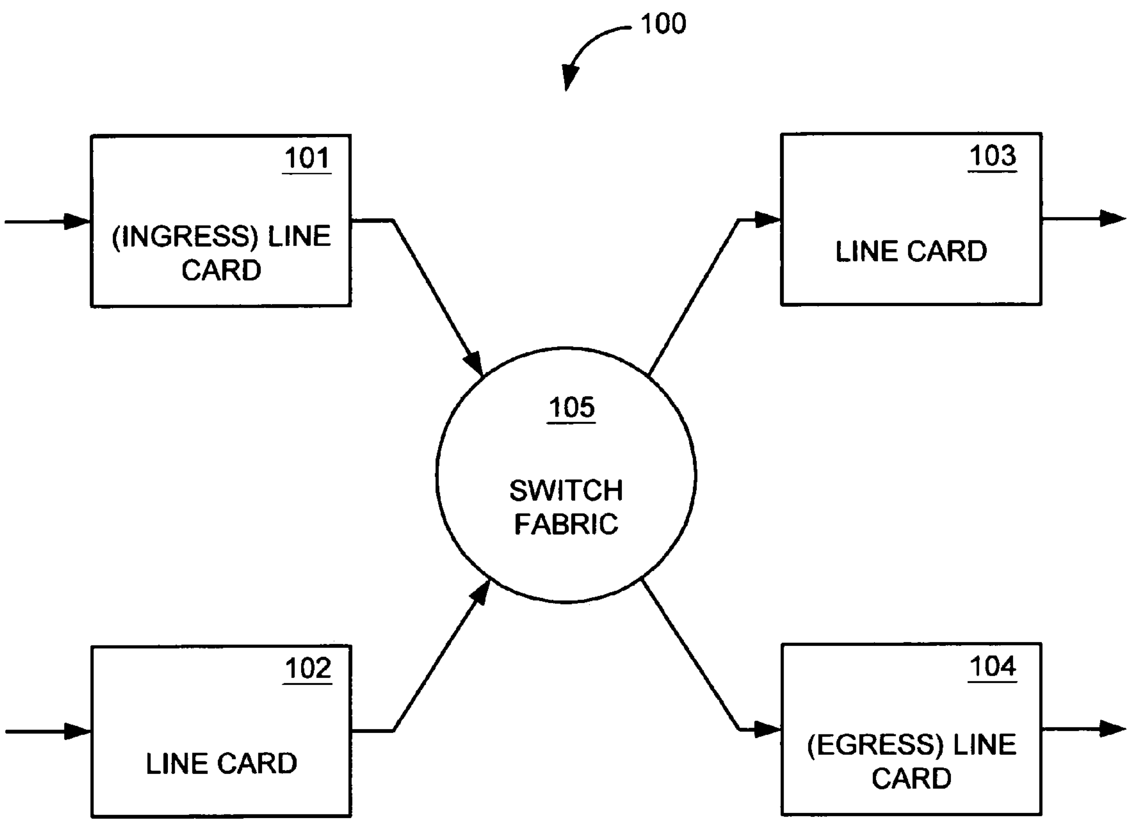
FIG. 1 illustrates a block diagram of a SONET NE.

FIG. 1 illustrates a block diagram of a SONET NE 100. The SONET NE 100 includes line cards 101~104 and a switch fabric 105. The line card 101 is denoted an ingress line card, because data enters the SONET NE 100 through it. The line card 104, on the other hand, is denoted an egress line card, because data exits the SONET NE 100 through it. The switch fabric 105 serves to route data passing through the SONET NE 100 from an ingress line card, such as line card 101 in this example, to the proper egress line card, such as line card 104 in this example. Typically, each of the line cards 101~104 may function as an ingress or egress line card, depending upon whether it is receiving or transmitting data.

Figure 2:
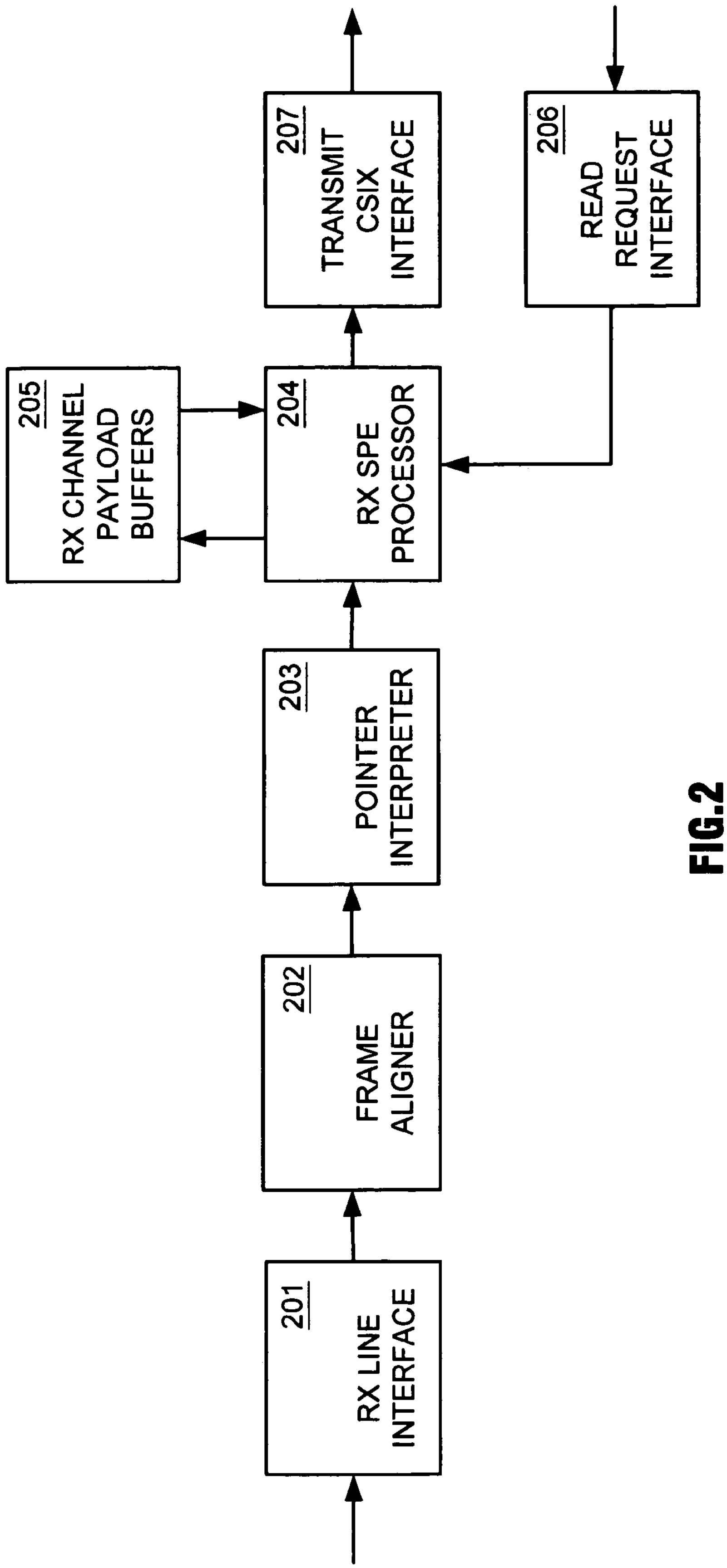
FIG. 2 illustrates a block diagram of portions of an ingress line card including an apparatus for reducing jitter in SPE data transmitted to a switch fabric, utilizing aspects of the present invention.

FIG. 2 illustrates a block diagram of portions of ingress line card 101 including an apparatus for reducing jitter in SPE data transmitted to a switch fabric. A receive (RX) line interface 201 has sixteen STS-12 receive line interfaces, so that an STS-48c channel is carried across four STS-12 interfaces while an STS-192 channel is carried across all sixteen STS-12 interfaces. Each interface receives 1-bit serial data at 622.08 MHz, performs clock recovery from the incoming data stream, and converts the serial data to 8-bit parallel data at 77.76 MHz using the recovered clock. The 8-bit parallel data is then synchronized to a local 77.76 MHz clock by writing data into a buffer using the recovered 77.76 MHz clock signal, and reading data out of the buffer using the local 77.76 MHz clock. Data read out of the synchronizing buffer is then byte aligned and frame aligned using the A1 and A2 framing bytes in the overhead section of each SONET frame.

Incoming data streams carrying STS-1 and STS-Nc channels, where N<=12, do not have to be frame-synchronous with another for them to be processed. Streams that are carrying part of an STS-Nc channel, where N>12, however, should be frame-synchronous with one another in order for them to be processed properly. Thus, four STS-12 streams carrying an STS-48c channel should be frame synchronous, and in the case of an STS-192c channel, all sixteen STS-12 streams should be frame-synchronous. After passing over the inter-chip interconnect and through the RX line interface 201, such frame-synchronous streams may lose their frame alignment. Frame aligner 202 frame-realigns these streams using a small alignment FIFO for each STS-12 stream.

Pointer interpreter 203 interprets the H1 and H2 pointer bytes in the overhead sections of SONET frames to generate STS frame timing signals that identify the start of each synchronous payload envelope (SPE) and provide SPE valid timing in the frames. In addition, the pointer interpreter 203 interprets the H3 pointer byte in the overhead sections of SONET frames to detect ingress positive and negative frequency adjustments on the channels. The pointer interpreter 203 then forwards the sixteen STS-12 streams, the SPE frame timing, and the positive and negative frequency adjustment information to an RX SPE processor 204.

The RX SPE processor 204 uses the STS frame timing signals to extract the SPE out of the STS-12 streams, and store them in receive (RX) channel payload buffers 205. In order to properly extract STS-48c and STS-192c channels out of the STS-12 streams, the STS-12 streams are passed through a time slot interchange before storing in the RX channel payload buffers 205. The time slot interchange reorders the bytes read off the STS-12 streams according to the STS-N multiplexing rules, which require an STS-12 channel to be interleaved 4-byte chunks at a time. STS-12 streams carrying STS-1 and STS-Nc channels, where N<=12, bypass the time slot interchange.

The RX channel payload buffers 205 include a payload buffer assigned to each channel. Each STS-1 has a 64-byte buffer assigned to it. For concatenated payloads, a proportional number of STS-1 buffers are concatenated to form the channel payload buffer. In addition to storing the channel SPE data, an indication of the start of each SPE is also stored in the channel payload buffer.

A read request interface 206 receives channel read requests from the switch fabric 105, stores them in a 32-deep FIFO, and forwards the channel read requests one-by-one to the RX SPE processor 204. The switch fabric 105 generates the channel read requests based on its time slot configuration for various channels. The channel read request takes the form of an 8-bit channel identification and a 1-bit channel read request valid signal transmitted through a 125 MHz bus coupling the line card 101 to the switch fabric 105.

A segmentation engine in the RX SPE processor 204 receives the channel read request forwarded by the read request interface 206, segments the requested channel's SPE data from the channel payload buffer into a PDU of a time division multiplexed (TDM) cell, and inserts the TDM cell into the PDU of a protocol independent cell (PIC). The segmentation engine also determines the length of the SPE data loaded into the TDM cell PDU by conventional counter means, and stores the length along with additional control information in the PIC header to facilitate reassembly of the SPE data stream back into SPE form on the egress side of the switch fabric 105. The PIC is then sent to the switch fabric 105 in a CSIX frame through the transmit CSIX interface 207, which is responsible for transferring all ingress cell traffic to the switch fabric 105 across the industry standard CSIX interface.

Each PIC has a 4-byte header and 64-byte PDU, and each TDM cell has a 1-byte header and 63-byte PDU. Since a TDM cell PDU can carry data belonging to two consecutive SPE's, a start-of-SPE indicator and a next SPE pointer are provided in the TDM header to accommodate such occurrence. Since the TDM PDU is 63-bytes, the maximum number of SPE data bytes that can be loaded into a PIC for transmission to the switch fabric 105 is 63-bytes. The actual number is variable, however, since the number of SPE data bytes read and put into a TDM cell PDU by the segmentation engine depends upon how many SPE data bytes are in the requested channel buffer at the time of the channel read request from the switch fabric 105.

Thus, if there are only 32 bytes of SPE data at the time the switch fabric 105 makes its read request, only 32 bytes of SPE data are loaded in the TDM cell PDU, and the length of the SPE data is indicated as 32 bytes in the PIC header. It may also be possible that the channel payload buffer from which SPE data is being requested is empty when the switch fabric 105 makes its read request. This situation might occur, for example, if the bandwidth allocated to the requested channel by the switch fabric 105 is far in excess of what is needed. In this case, an empty cell containing an all zero payload is loaded into the TDM PDU and the length of the SPE data is indicated as 0 bytes in the PIC header.

By facilitating variable length SPE data payloads in the TDM PDU being transmitted, no opportunity is wasted to transmit SPE data to the switch fabric 105. This is useful to prevent loss of SPE data through buffer overflow and minimizes jitter in the SPE data transmitted to the switch fabric 105.

Figure 3:
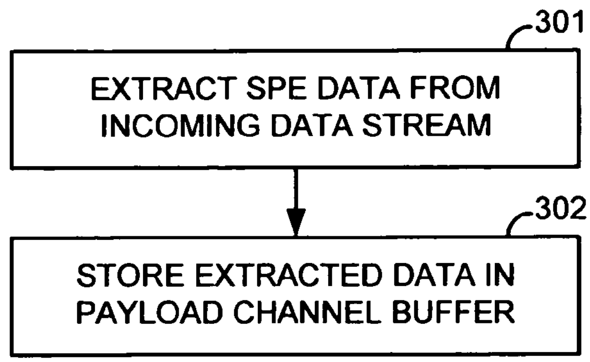
FIG. 3 illustrates a flow diagram of a method of loading channel payload buffers with SPE data from an incoming SPE data stream.

Although the switch fabric 105 controls its communications with line cards 101~104, it operates asynchronously with the external communications of the line cards 101~104. FIG. 3 illustrates, for example, a flow diagram of a method performed by the RX SPE processor 204 of loading channel payload buffers with SPE data from an incoming SPE data stream, using the local 77.76 MHz clock. As previously described, in 301, the RX SPE processor 204 extracts SPE data from the incoming data stream, and in 302, the RX SPE processor 204 stores the extracted SPE data in appropriate ones of the RX channel payload buffers 205.

Figure 4:
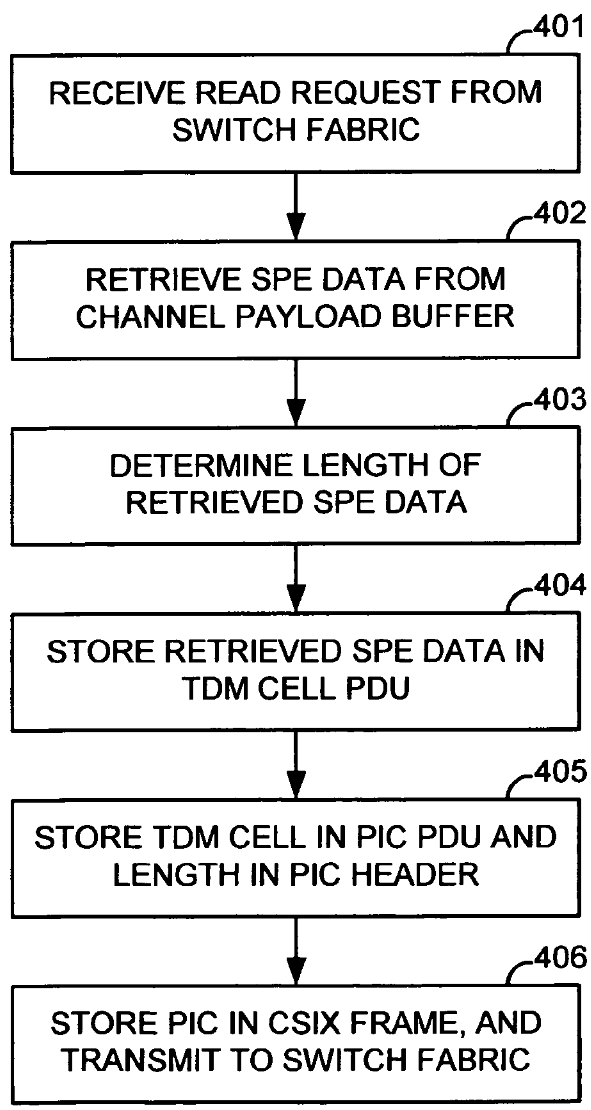
FIG. 4 illustrates a flow diagram of a method for reducing jitter in SPE data transmitted to a switch fabric, utilizing aspects of the present invention.

FIG. 4, on the other hand, illustrates a flow diagram of a method performed by the segmentation engine in the RX SPE processor 204 and the transmit CSIX interface 207 for reducing jitter in SPE data transmitted to the switch fabric 105, wherein the segmentation engine uses a local 125 MHz clock that matches the bus rate of the read request from the switch fabric 105 and the transmit CSIX interface 207 uses the 250 MHz CSIX bus rate. In 401, the segmentation engine receives a read request originating from the switch fabric 105. As previously described, the read request comes in the form an 8-bit channel identification and a 1-bit channel read request valid signal that is received by the read request interface 206 and passed through to the segmentation engine. In 402, the segmentation engine retrieves SPE data from the channel payload buffer corresponding to the requested channel. As previously described, the segmentation engine retrieves up to 63 bytes of data, which is the maximum amount loadable into the PDU of a TDM cell. If there are less than 63 bytes of SPE data available in the channel payload buffer, the segmentation retrieves all available bytes. In 403, the segmentation engine determines the length of the retrieved SPE data. In 404, the segmentation engine loads the retrieved SPE data into the PDU of a TDM cell. In 405, the segmentation engine then stores the TDM cell into the PDU of a PIC, and stores the length of the SPE data into the header of the PIC. In 406, the transmit CSIX interface 207 receives the PIC from the segmentation engine, stores the PIC in a CSIX frame, and transmits the CSIX frame to the switch fabric 105.

Although the various aspects of the present invention have been described with respect to a preferred embodiment, it will be understood that the invention is entitled to full protection within the full scope of the appended claims.

I claim:

1. An apparatus for preparing arriving, SPE-sourced data (data obtained from a Synchronous Payload Envelope of a SONET transmission) for subsequent transmission through a switch fabric, where said switch fabric produces data read requests at a request rate independent of an arrival rate at which the arriving SPE-sourced data arrives for next being transmitted to the switch fabric, the apparatus comprising:

(a) a buffer for receiving the arriving SPE-sourced data; and (b) means for:

(b.1) receiving a request from the switch fabric to transmit to the switch fabric, current contents of said buffer in a payload data unit (PDU) carryable by the switch fabric;

(b.2) transferring a currently buffered length of SPE-sourced data from said buffer into said payload data unit (PDU), and (b.3) transmitting to said switch fabric, said payload data unit (PDU) containing the transferred length of SPE-sourced data along with an indication of the length of the transferred length of SPE-sourced, where said indication can indicate a zero length.

2. The apparatus according to claim 1, wherein said means for receiving, transferring and transmitting includes:

(b.4) a processor; and (b.5) interface circuitry coupling said processor to said switch fabric.

3. The apparatus according to claim 2, wherein said interface circuitry includes (b.4a) a read request interface for receiving each request from said switch fabric to transmit current contents of said buffer.

4. The apparatus according to claim 2, wherein said interface circuitry includes (b.4b) a transmit CSIX interface for transmitting said payload data unit (PDU) to said switch fabric within a CSIX frame.

5. The apparatus according to claim 1, wherein said means for receiving, transferring and transmitting is further for:

(b.4) extracting the SPE-sourced data from an incoming SPE data stream, and (b.5) storing said extracted SPE data in said buffer using a first clock signal having a first clock rate related to the data arrival rate of said incoming SPE data stream.

6. The apparatus according to claim 5, wherein said request from the switch fabric to transmit current contents of said buffer is received by said means asynchronously relative to said first clock signal.

7. The apparatus according to claim 1, wherein said payload data unit (PDU) carryable by the switch fabric is part of a first cell which is included in a second payload data unit of a second cell that is also carryable by the switch fabric.

8. The apparatus according to claim 7, wherein said means for receiving, transferring and transmitting transmits said first cell as a time division multiplexed (TDM) cell.

9. The apparatus according to claim 7, wherein said second cell is a protocol independent cell (PIC) that is carryable by the switch fabric.

10. The apparatus according to claim 9, wherein said protocol independent cell (PIC) has a header having a location reserved for storing said indication of the length of said transferred length of SPE-sourced data.

11. The apparatus according to claim 10, wherein said means for receiving, transferring and transmitting transmits said protocol independent cell (PIC) to said switch fabric through a CSIX interface.

12. The apparatus according to claim 11, wherein said request received from said switch fabric to transmit contents of said buffer is provided at a second clock rate related to a data rate of said CSIX interface.

13. An apparatus for preparing arriving, SPE-sourced data (data obtained from a Synchronous Payload Envelope of a SONET transmission) for subsequent transmission through a switch fabric, where said switch fabric produces data read requests at a request rate independent of an arrival rate at which the arriving SPE-sourced data arrives for next being transmitted to the switch fabric, the apparatus comprising:

(a) a plurality of buffers each allocated to a corresponding one of plural channel numbers; and means for:

(b.1) receiving buffer read requests and buffer-identifying channel indicators from the switch fabric, (b.2) transferring currently buffered lengths of SPE-sourced data from identified ones of said buffers into corresponding payload data units (PDUs), (b.3) determining lengths of said transferred SPE-sourced data, and (b.4) transmitting to the switch fabric, said corresponding payload data units (PDUs) along with indications of the corresponding lengths of their contained SPE-sourced data, where said indications can include indications of zero lengths.

14. The apparatus according to claim 13, wherein said means for receiving transferring determining and transmitting is further for:

(b.5) extracting the SPE-sourced data from incoming SPE data streams, and (b.6) storing said extracted SPE data in said plurality of buffers using a first clock signal having a first clock rate related to a data rate of said incoming SPE data streams.

15. The apparatus according to claim 14, wherein said requests and channel indicators received from said switch fabric are received asynchronous relative to said first clock signal.

16. The apparatus according to claim 15, wherein said means is further for:

(b.5) transmitting said payload data units along with their corresponding length indications to said switch fabric at a transmission rate, and where said requests and channel indicators are received from said switch fabric at a second clock rate related to said transmission rate.

17. A method for preparing arriving, SPE-sourced data (data obtained from a Synchronous Payload Envelope of a SONET transmission) for subsequent transmission through a switch fabric, where said switch fabric produces data read requests at a request rate independent of an arrival rate at which the arriving SPE-sourced data arrives for next being transmitted to the switch fabric, the method comprising:

(a) receiving a read request from the switch fabric to transmit contents of a buffer corresponding to the read request in a payload data unit regardless of whether there is or the amount of SPE data in said buffer at the time of receiving said read request;

(b) segmenting SPE data from said buffer into said payload data unit;

(c) determining a length of the segmented SPE data; and (d) transmitting said payload data unit along with said length to said switch fabric at a transmission rate.

18. The method according to claim 17, wherein said receiving a read request from a switch fabric, comprises receiving a channel number and read indication from said switch fabric.

19. The method according to claim 18, wherein said buffer is assigned to said channel number.

20. The method according to claim 17, further comprising:

extracting SPE data from an incoming SPE data stream; and storing said extracted SPE data in a buffer assigned to said extracted SPE data using a first clock signal having a first clock rate related to a data rate of said incoming SPE data stream.

21. The method according to claim 20, wherein said receiving a read request from a switch fabric is asynchronous to said first clock signal.

22. The method according to claim 21, wherein said receiving a read request from a switch fabric is at a second clock rate related to said transmission rate.

23. The method according to claim 17, wherein said transmitting said payload data unit and said length to said switch fabric, includes storing the segmented SPE data in a payload data unit of a time division multiplexed cell and including said time division multiplexed cell in a payload data unit of a protocol independent cell.

24. The method according to claim 23, wherein said protocol independent cell has a header having a location reserved for storing said length of said segment of said SPE data stored in said payload data unit of said time division multiplexed cell.

25. The method according to claim 24, wherein said transmitting said payload data unit along with said length to said switch fabric, further includes transmitting said protocol independent cell to said switch fabric through a transmit CSIX interface.

26. An apparatus for preparing arriving, SPE-sourced data (data obtained from a Synchronous Payload Envelope of a SONET transmission) for subsequent transmission through a switch fabric where said switch fabric produces data read requests at a request rate independent of an arrival rate at which the arriving SPE-sourced data arrives for next being transmitted to the switch fabric, the apparatus comprising:

(a) a buffer for receiving the arriving SPE-sourced data; and (b) logic configured to receive a request from the switch fabric to transmit contents of said buffer, regardless of whether there is any valid SPE-sourced data present or the amount of valid SPE-sourced data present in said buffer at the time of the request is received, said logic being configured to further segment available SPE-sourced data, if any from said buffer into a first payload data unit (PDU) of a first cell that is transportable by said switch fabric; said logic being configured to further determine a length of the segment of SPE-sourced data in said payload data unit of said first cell, and to transmit said first cell in a second payload data unit of a second cell and to transmit said length of the segment of SPE-sourced data in a header of said second cell.

27. The apparatus according to claim 26, wherein for at least one instance, said buffer is empty of valid SPE-sourced data at the time of receiving said request from said switch fabric to transmit contents of said buffer and where nonetheless, said logic transmits an empty first cell in said second payload data unit of said second cell and said logic transmits a zero length for said length of the segment of SPE-sourced data in said header of said second cell.

28. The apparatus according to claim 26, wherein for at least one instance, said buffer includes less than a payload-filling amount of valid SPE-sourced data at the time of receiving said request from said switch fabric and where nonetheless, said logic transmits the less than payload-filling amount of SPE-sourced data within the first cell, which first cell is in said payload data unit of said second cell.

29. The apparatus according to claim 26, wherein for at least one instance, said buffer includes more than a payload-filling amount of valid SPE-sourced data at the time of receiving said request from said switch fabric and where in response to the received request, said logic transmits a full first cell in said payload data unit of said second cell.

30. The apparatus according to claim 26, wherein said first cell is a time division multiplexed (TDM) cell.

31. The apparatus according to claim 26, wherein said second cell is a protocol independent cell (PIC) carryable by said switch fabric.

32. A method for preparing source data of an arriving data stream for transmission through a switch fabric that issues data read requests at a request rate independent of an arrival rate at which said source data arrives, the method comprising:

(a) buffering the arriving source data;

(b) receiving at least one of plural requests for buffered data from the switch fabric that is to route the arriving source data to a data egress location;

(c) in response to said receiving, determining a length of then buffered and valid arriving source data, if any at all, which can be transferred to fully or partially fill a payload carrying section of a predefined, first payload data unit (PDU);

(d) further in response to said receiving, transmitting to the switch fabric, said first PDU where the transmitted first PDU contains the determined length of then buffered and valid source data; and (e) further in response to said receiving, transmitting to the switch fabric, an indication representing said determined length, where the determined length can be in the inclusive range of zero to the full payload carrying capacity of said first PDU.

33. A data routing system comprising:

(a) a plurality of buffers each for receiving and storing corresponding ones of arriving data units arriving from respective data streams that are streaming at respective source streaming rates;

(b) a request processor, operatively coupled to said plurality of buffers, the request processor being configured to receive plural requests for buffered data from a switch fabric that is to route the arriving data units to plural data egress locations in accordance with channel identifiers logically assigned to the plural buffers, where the requests for buffered data can be received asynchronously relative to said receiving by the respective buffers of their corresponding ones of arriving data units;

(b.1) wherein in response to received requests for buffered data, the request processor determines a length of then buffered and valid source data within a request-matching buffer, if any at all, which valid source data can transferred so as to fully or partially fill a payload carrying section of a predefined, first payload data unit (PDU) that is to be carried by the switch fabric;

(b.2) wherein further in response to received requests for buffered data, the request processor causes the first PDU to be transmitted to the switch fabric, where the transmitted first PDU contains the determined length of then buffered and valid source data of a corresponding, request-matching buffer; and (b.3) wherein further in response to received requests for buffered data, the request processor causes an indication representing said determined length to be transmitted to the switch fabric, where the determined length can be in the inclusive range of zero to the full payload carrying capacity of said first PDU.

34. A method of responding to read requests sent by a switch fabric operating in synchronism with a first data transfer clock where the read requests each specify a corresponding channel for which ingressing stream data is to be sent to the switch fabric for routing via the switch fabric to a channel-defined egress path, and where availability of a sufficient amount of ingressed stream data to efficiently fill a predefined payload carrying portion of a predefined data-transfer cell that is to be sent to the switch fabric is variable due to timings of the sent read requests, the method comprising:

(a) determining for a channel specified by a received read request, a length of corresponding ingressed and buffered stream data, if any such ingressed data is then available, that can be fitted partially or fully into the payload carrying portion of the predefined data-transfer cell that is to be sent to the switch fabric in response to the received read request;

(b) placing a segmented length of the corresponding ingressed and buffered data, if any, into the payload carrying portion within the to-be-sent data-transfer cell in accordance with the determined length, where said length has an inclusive value domain from zero to the maximal payload carrying size of the payload carrying portion, the zero value being designated when ingressed and buffered stream data is not available for the correspondingly specified channel of the received read request;

(c) placing in a header portion of the to-be-sent data-transfer cell, a length indicator representing said determined length of the corresponding ingressed and buffered stream data; and (d) in response to the received read request, transmitting to the switch fabric the data-transfer cell having said length indicator and said segmented length of the corresponding ingressed and buffered stream data, if any, the transmission of said data-transfer cell occurring even if the determined length is zero.

* * * * *